(12) United States Patent
Schaffer et al.

(10) Patent No.: US 7,070,331 B2
(45) Date of Patent: Jul. 4, 2006

(54) HINGE BOLT MODULAR UNIT

(75) Inventors: Kurt Schaffer, Seckau (AT); Bernhard Ebner, Knittelfeld (AT); Erich Brandl, Grosslobming (AT)

(73) Assignee: VOEST-ALPINE Bergtechnik Gesellschaft m.b.H., Zeltweg (AT)

( * ) Notice: Subject to any disclaimer, the term of this patent is extended or adjusted under 35 U.S.C. 154(b) by 77 days.

(21) Appl. No.: 10/496,216

(22) PCT Filed: Nov. 18, 2002

(86) PCT No.: PCT/AT02/00320

§ 371 (c)(1),
(2), (4) Date: May 20, 2004

(87) PCT Pub. No.: WO03/044379

PCT Pub. Date: May 30, 2003

(65) Prior Publication Data
US 2005/0013518 A1    Jan. 20, 2005

(30) Foreign Application Priority Data
Nov. 22, 2001   (AT) .............................. A 1837/2001

(51) Int. Cl.
F16C 33/74    (2006.01)
F16C 11/04    (2006.01)

(52) U.S. Cl. .................. 384/130; 384/375; 384/396; 403/157

(58) Field of Classification Search .............. 384/130, 384/131, 152–156, 226, 322, 374, 375, 381, 384/396; 403/154–158, 161–163; 414/723; 29/898.1
See application file for complete search history.

(56) References Cited

U.S. PATENT DOCUMENTS

| 2,349,898 | A | * | 5/1944 | Bechman ................. 384/381 |
| 3,554,588 | A |   | 1/1971 | Reinsma et al. |
| 4,398,862 | A |   | 8/1983 | Schroeder |
| 4,772,150 | A |   | 9/1988 | Horton |
| 5,630,673 | A |   | 5/1997 | Krzywanos et al. |
| 6,120,189 | A |   | 9/2000 | Beagle et al. |
| 6,283,667 | B1 | * | 9/2001 | Neitzel ................. 403/158 |
| 6,322,280 | B1 | * | 11/2001 | Coyne ................... 403/158 |

FOREIGN PATENT DOCUMENTS

| GB | 160345 | 3/1921 |
| JP | 09177125 | 7/1997 |
| JP | 11037138 | 2/1999 |
| JP | 2001349322 | 12/2001 |
| WO | WO 98/02618 | 1/1998 |

* cited by examiner

*Primary Examiner*—Thomas R. Hannon
(74) *Attorney, Agent, or Firm*—Chapman and Cutler LLP

(57) ABSTRACT

The joint-pin modular unit for articulately connecting a fork-type or stirrup device (1) with a connecting eye embracing a joint pin (8) of the fork-type or stirrup device (1), includes at least one seal (9) provided between the connecting eye and the pin, wherein the joint pin (8) is rotationally guided in bearing bushes (6, 7) of the fork-type or stirrup device (1) and annular seals (9) are arranged between the connecting eye and the bearing bush end faces located adjacent to the connecting eye. The externally located end faces of the pin (8) are closed by covers (10, 11) tightly covering the bearing bushes (6, 7), wherein the surface of the pin is surrounded by a lubricant film and at least one substantially axial bore (13), and a plurality of radial bores (14, 15) leading to the surface of the pin, are provided for the supply of lubricant.

20 Claims, 2 Drawing Sheets

HINGE BOLT MODULAR UNIT

Figure 1:
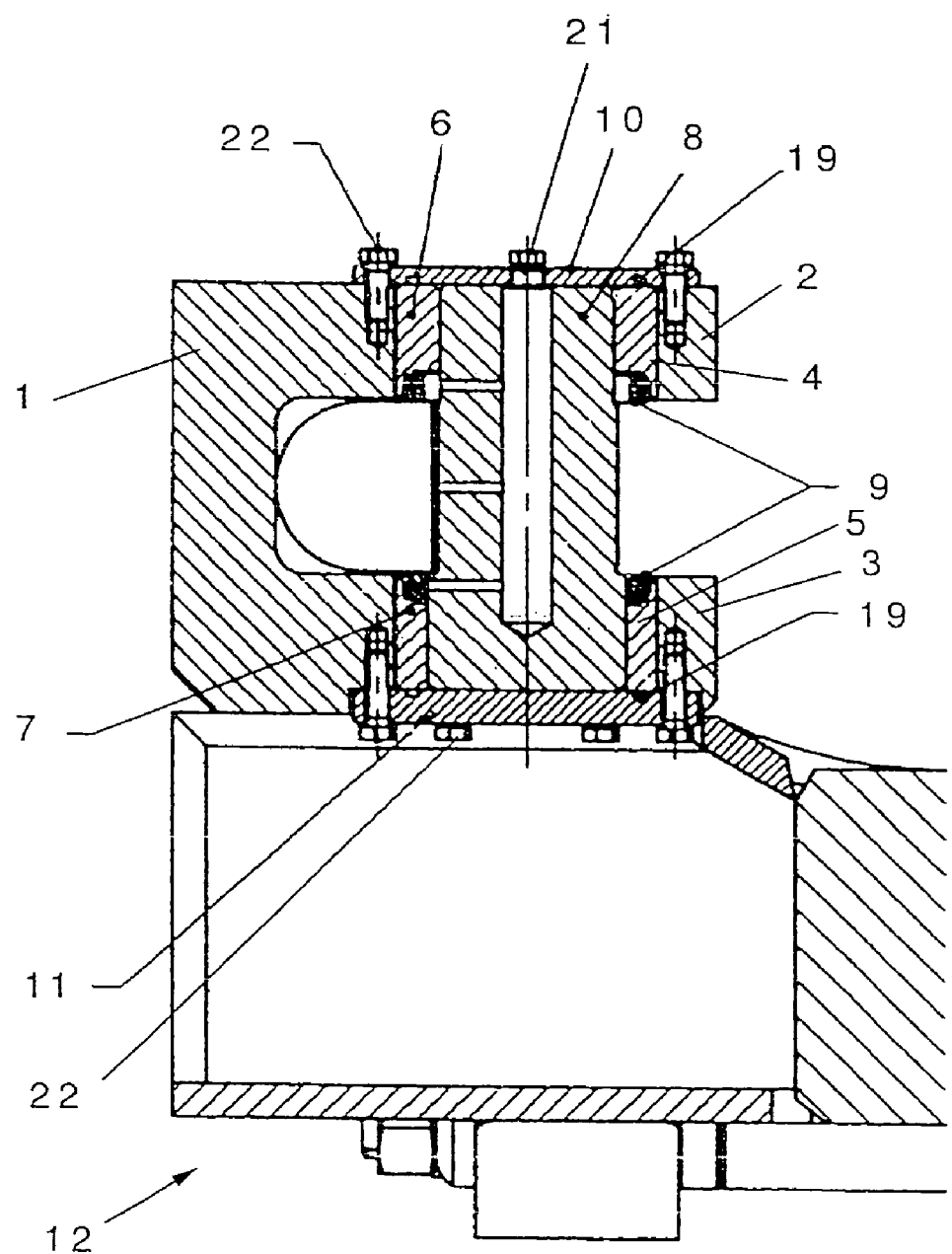

The invention relates to a joint-pin modular unit for articulately connecting a fork-type or stirrup device with a connecting eye embracing a joint pin of the fork-type or stirrup device, including at least one seal provided between the connecting eye and the pin.

Joint-Pin modular units of the initially mentioned type are used to articulately connect assemblies and, in particular, highly stressed assemblies. Examples of application for such joint-pin modular units include, for instance, cranes, excavators or mining machines, in which booms, drags or other highly stressed parts have to be mounted in an appropriately pivotable manner. The connecting eyes in such cases may be formed on guide rods, or on piston rods of hydraulic cylinder-piston units, with the joint pins having to pass through the connecting eye and be themselves appropriately supported or mounted. In the simplest case, joint pins of this type can be fixed in forks or stirrups used as supporting structures for said joint pins. A device of the initially defined type may, for instance, be taken from DE 37 38 571 A1. In that known configuration, a stationary joint pin is provided, which is connected with the supporting structure or fork in a rotationally fast manner. The joint pin is sealingly fixed in a bush of the supporting structure with the connecting eye attacking in the central region of the joint pin. The connecting eye itself is in turn sealed, by an appropriate sliding ring seal, relative to the bushes intended to receive the joint pin. Similar constructions comprising stationary bearing pins may, for instance, also be taken from DE 197 81 866. In the configuration according to U.S. Pat. No. 3,554,588, the external bearing bushes are welded with the joint pin, and a suitable sliding ring seal is provided in the pressed-in bearing bushes to seal the supporting elements or fork relative to the pivotable connecting eye.

A substantial demand placed on such constructions resides in the self-lubricating and tightly encapsulated design of the joint-pin modular unit, wherein the tightness must be guaranteed despite the torsion occurring in the forks or stirrup holders. Local squeezing of the lubricating film may occur in the event of joint-pin modular units designed to be self-lubricating, particularly under high loads exerted on the bearing, whereby elevated frictional resistances may be caused, which may result in a wear of the bearing bushes and subsequently in the deterioration of the tightness of the bearing site. Especially high loads occur, for instance, during the engagement of disc cutting tools with the rock, in which case a configuration as largely play-free as possible will have to be provided in addition, since a permanent contact with the rock will be required when cutting by the aid of discs in order to maintain the necessary cutting performance. In an abrasive environment as is provided in the case of disc cutting tools, increased demands are simultaneously placed on the tightness of the bearing sites in order to reduce wear.

The invention aims to further develop a joint-pin modular unit of the initially defined kind to the extent that it can be kept largely play-free and tight even under extreme loads, while local squeezing of the lubricating film is to be prevented at the same time. To solve this object, the joint-pin modular unit according to the invention, of the initially defined kind consists essentially in that the joint pin is rotationally guided in bearing bushes of the fork-type or stirrup device, that annular seals are arranged between the connecting eye and the bearing bush end faces located adjacent to the connecting eye, that the externally located end faces of the pin are closed by covers tightly covering the bearing bushes, and that the surface of the pin is surrounded by a lubricant film, wherein at least one substantially axial bore, and a plurality of radial bores leading to the surface of the pin, are provided for the supply of lubricant. Due to the fact that the joint pin is surrounded by lubricant about its entire outer surface on account of the joint pin design according to the invention, loads that might result in a squeezing of the lubricant film are distributed over a substantially enlarged surface such that local overloads will be avoided and an effective lubricant film will be maintained in every phase so as to avoid the risks of rubbing and an increased wear of the bearing bushes. This will be ensured in that the joint pin is itself rotationally guided in appropriate bearing bushes of the fork-type or stirrup device so as to cause the lubricant film to extend over the entire axial length of the joint pin. At the same time, also the two end faces of the rotationally mounted joint pin are protected by an appropriate lubricant film, to which end the two outwardly located adjusting surfaces of the pin are closed by covers sealingly covering the bearing bushes. Permanent lubrication or self-lubrication will be maintained by providing an accordingly large axial bore with a reservoir of lubricant, to which radial bores are connected to distribute said lubricant onto the surface of the pin. In order to simultaneously safeguard an efficient locking of the annular seals or sliding ring seals, the configuration advantageously is devised such that radial bores are arranged in the cross-sectional planes of the annular seals or sliding ring seals.

In a particularly simple manner, the connecting eye may be designed as a bearing bush pressed into a head part of a rod so as to enable the use of accordingly high-quality bearing components for the structural components directly cooperating with the joint pin, i.e. the bearing bushes in the fork-type or stirrup device and the bearing bush of the pivotable part. Thus, the bushes may, for instance, be made of the material X90CrMoV18 and hardened to 57 HRC on their inner surfaces. The pin itself may be comprised of the material X17CrNi16-2 and coated with castolin bronze on its outer surfaces. In order to reliably prevent any risk of squeezing of the lubricant, a lubricant having a viscosity of more than 300 cSt and, in particular, 320 cSt is advantageously employed.

The assembly of the joint pin, and its removal optionally required for maintenance works, can be considerably facilitated in that the pin is designed to be stepped in the axial section, comprising a first portion having a diameter exceeding the clear diameter of the connecting eye and a central portion having a diameter substantially corresponding with the clear diameter of the connecting eye. In this manner, only those pressure forces which occur in the larger-diameter region in order to overcome an appropriately play-free mounting of the pin will have to be overcome during installation and removal, since further axial portions of the pin can be passed through this region with play during the installation and removal of the pin. Naturally, also the other end must be mounted in an accordingly play-free manner such that in this first partial region of the insertion or removal of the pin the pressure forces will also have an impact on this region. To this end, the configuration is advantageously devised such that the pin comprises an end portion having a diameter smaller than the diameter of the central portion, and that the bearing bushes comprise accordingly different clear diameters. The axial adjustment of the connecting eye can be effected by means of the stop shoulder formed by the pin portion having the largest external diameter, so that the pivotable component will be kept in an appropriate safety distance from the fork-type or stirrup device.

In order to provide a suitable amount of lubricant for permanent lubrication even with a horizontally installed joint pin, the configuration is advantageously devised such that the axial bore is connected with an oil chamber attached to a cover.

In a particularly advantageous manner, the joint-pin modular unit is suitable for use in the mounting of advance-working or actuating cylinder-piston units of cutting booms as they are used, for instance, in mining machines.

In the following, the invention will be explained in more detail by way of an exemplary embodiment schematically illustrated in the drawing.

Figure 2:
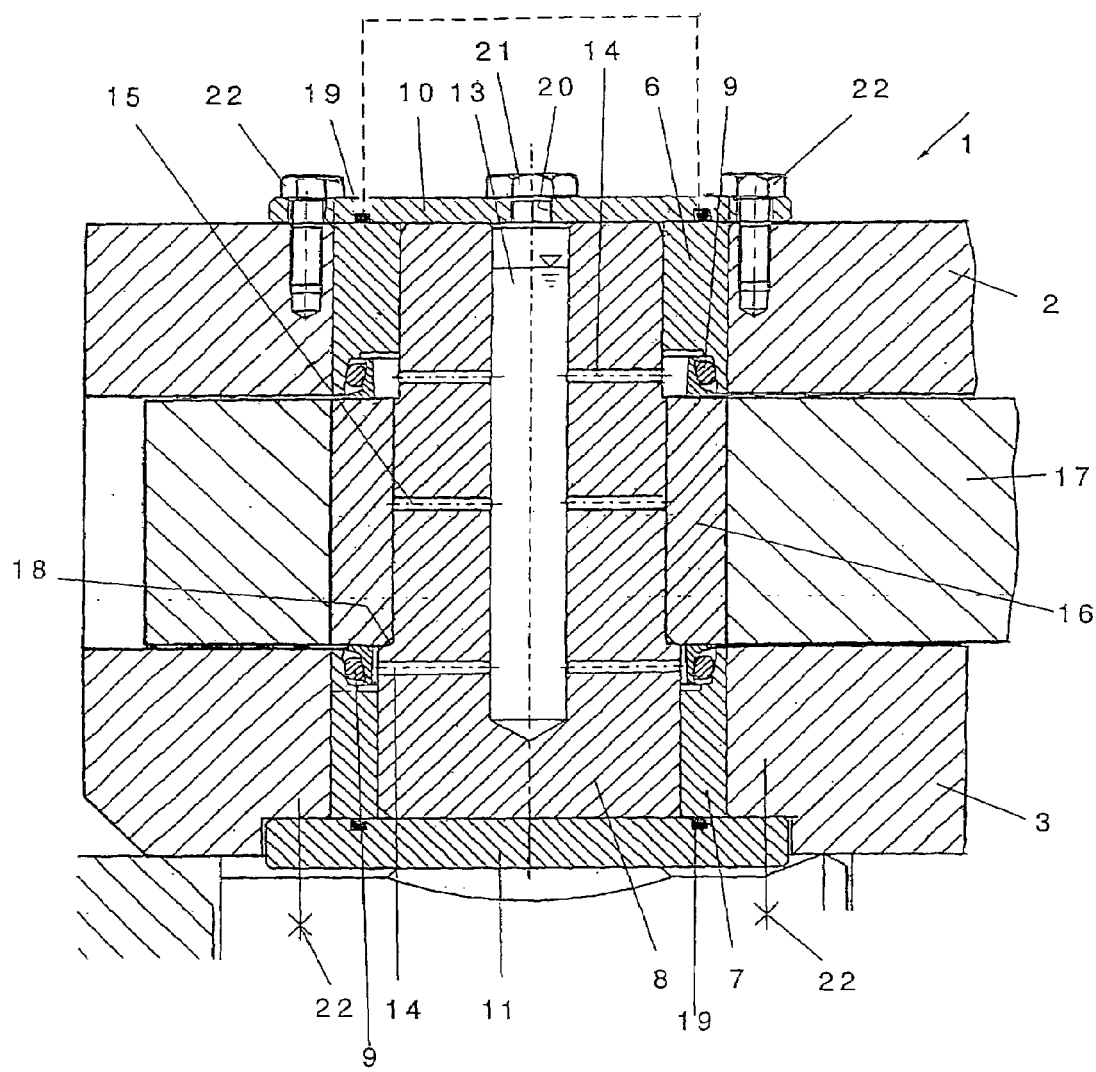

Therein, FIG. 1 is a section through the fork-type or stirrup device with a joint pin inserted therein; and FIG. 2 is an enlarged sectional illustration according to FIG. 1 with a joint pin inserted therein and a connecting eye attached thereto.

FIG. 1 depicts a fork-type or stirrup device 1 which comprises two legs 2 and 3. The legs include respective recesses 4 and 5 for the respective reception of one bearing bush 6 and 7 each. The joint pin 8 is designed to be stepped in the axial section, its first portion inserted in the bearing bush 7 having a larger outer diameter than its end portion inserted in the bearing bush 6. Sliding ring seals are denoted by 9. The openings 4 and 5 are closed by covers 10 and 11, respectively, upon insertion of the joint pin 8, with the whole fork-type or stirrup device being fixed to a console 12. Details of the mounting and lubrication are more clearly apparent from the illustration according to FIG. 2. The joint pin 8, which is configured in steps in the axial section, comprises a central bore 13 having an accordingly large diameter to receive a lubricant reservoir. The lubricant reaches the region of the sliding ring seals 9 via radial bores 14. Another radial bore 15 leads to a bearing bush 16 of a bearing eye for a pivotable arm 17. The stop shoulder 18 formed by the stepped configuration of the joint pin 8 allows for suitable adjustment of the bearing bush 16 of the bearing eye in a manner that the pivotable component 17 will be held at a distance from the legs 2 and 3 of the fork-type or stirrup device. The outwardly arranged covers 10 and 11 each comprise seals 19 formed by O-rings and cooperating with the end faces of the bearing bushes 5 and 4, respectively, thus providing a tight closure towards outside. In this manner, a stable lubricant film can also build up between the end faces of the joint pin 8 and the covers 10 and 11, respectively. The joint pin 8 is rotatable within the bearing bushes 4 and 5. Likewise, the bearing bush 16 of the bearing eye will slide along the jacket of the central portion of the joint pin 8 at a pivotal movement of the arm 17. If the frictional resistance between the bearing bush 16 and the central portion of the joint pin 8 exceeds a predetermined value during operation, the joint pin 8 can be rotated within the bushes 4 and 5 in order to avoid any overload and hence rubbing. The sliding ring seals 9 are continuously lubricated by the lubricant available in the central axial bore 13, the reservoir in the central bore 13 being sufficiently large to take into account slight leakages of the sliding ring seals 9. As is clearly apparent from FIG. 2, the clear width of the bearing bush 4 is smaller than the clear width of the bearing bush 5 and thus corresponds with the stepped configuration of the joint pin 8. Lubricant can be filled in via a bore 20 provided in the cover 10, which bore is closable by the aid of a screw plug 21. The covers are connected with the fork-type or stirrup device by means of screws 22 just schematically indicated in the region of leg 3, wherein appropriate sealing is ensured by the O-ring seals 19.

The rotational balancing movement of the joint pin 8, which is feasible in the event of an elevated friction relative to the bearing bush 16, ensures a homogenization of the forces and a balanced distribution over the lubricant film available along the entire axial length of the joint pin 8, so that local lubricant squeezing will be avoided and eventual wear will be minimized. The configuration is, thus, also suitable for the absorption of extremely high forces and, in particular, for use in mining machines in which the advance-working movement is controlled by a cylinder-piston unit connected to the toggle link 17.

The invention claimed is:

1. A joint-pin modular unit for articulately connecting a fork-type or stirrup device (1) with a connecting eye embracing a joint pin (8) of the fork-type or stirrup device, comprising a plurality of seals (9) provided between the connecting eye and the pin (8), wherein the joint pin (8) is rotationally guided in bearing bushes (6, 7) of the fork-type or stirrup device (1) and externally located end faces of the pin (8) are closed by covers (10, 11) tightly covering the bearing bushes (6, 7), and a surface of the pin is surrounded by a lubricant film, wherein said seals are sliding ring seals (9) and are arranged between the connecting eye and bearing bush end faces located adjacent to the connecting eye, and wherein at least one substantially axial bore (13), and a plurality of radial bores (14, 15) leading to the surface of the pin in cross-sectional planes of the sliding ring seals, are provided for supply of lubricant.

2. A joint-pin modular unit according to claim 1, wherein the pin (8) is horizontally installed, and the axial bore (13) is connected with an oil chamber attached to a cover (10).

3. A joint-pin modular unit according to claim 1, wherein the lubricant has a viscosity of more than 320 cSt.

4. A joint-pin modular unit according to claim 1, wherein the lubricant has a viscosity of more than 300 cSt.

5. A joint-pin modular unit according to claim 4, wherein the pin (8) is horizontally installed, and the axial bore (13) is connected with an oil chamber attached to a cover (10).

6. A joint-pin modular unit according to claim 1, wherein the connecting eye is designed as a bearing bush (16) pressed into a head part of a rod.

7. A joint-pin modular unit according to claim 6, wherein the lubricant has a viscosity of more than 300 cSt.

8. A joint-pin modular unit according to claim 6, wherein the lubricant has a viscosity of more than 320 cSt.

9. A joint-pin modular unit according to claim 6, wherein the pin (8) is horizontally installed, and the axial bore (13) is connected with an oil chamber attached to a cover (10).

10. A joint-pin modular unit according to claim 1, wherein the pin (8) is stepped in an axial section, comprising a first portion having a diameter exceeding a clear diameter of the connecting eye, and a central portion having a diameter substantially corresponding with the clear diameter of the connecting eye.

11. A joint-pin modular unit according claim 10, wherein the connecting eye is designed as a bearing bush (16) pressed into a head part of a rod.

12. A joint-pin modular unit according to claim 10, wherein the lubricant has a viscosity of more than 300 cSt.

13. A joint-pin modular unit according to claim 10, wherein the lubricant has a viscosity of more than 320 cSt.

14. A joint-pin modular unit according to claim 10, wherein the pin (8) is horizontally installed, and the axial bore (13) is connected with an oil chamber attached to a cover (10).

15. A joint-pin modular unit according to claim 10, wherein the pin (8) comprises an end portion having a diameter smaller than the diameter of the central portion, and that the bearing bushes (6, 7, 16) comprise accordingly different clear diameters.

16. A joint-pin modular unit according claim 15, wherein the connecting eye is designed as a bearing bush (16) pressed into a head part of a rod.

17. A joint-pin modular unit according to claim 15, wherein the lubricant has a viscosity of more than 300 cSt.

18. A joint-pin modular unit according to claim 15, wherein the lubricant has a viscosity of more than 320 cSt.

19. A joint-pin modular unit according to claim 15, wherein the pin (8) is horizontally installed, and the axial bore (13) is connected with an oil chamber attached to a cover (10).

20. A method of mounting of advance-working or actuating cylinder-piston units of cutting booms, comprising the steps of providing a joint-pin modular unit for articulately connecting a fork-type or stirrup device (1) with a connecting eye embracing a joint pin (8) of the fork-type or stirrup device, comprising a plurality of seals (9) provided between the connecting eye and the pin (8), wherein the joint pin (8) is rotationally guided in bearing bushes (6, 7) of the fork-type or stirrup device (1) and externally located end faces of the pin (8) are closed by covers (10, 11) tightly covering the bearing bushes (6, 7), surrounding a surface of the pin with a lubricant film, wherein said seals are sliding ring seals (9) and are arranged between the connecting eye and bearing bush end faces located adjacent to the connecting eye, and providing at least one substantially axial bore (13), and a plurality of radial bores (14, 15) leading to the surface of the pin in cross-sectional planes of the sliding ring seals for supply of lubricant.

* * * * *